United States Patent [19]
Bigelow et al.

[11] Patent Number: 5,310,049
[45] Date of Patent: May 10, 1994

[54] FILM OR PAPER CASSETTE

[75] Inventors: Donald O. Bigelow, Webster; Craig A. Caprio, Rochester; John B. Chemelli, Webster, all of N.Y.

[73] Assignee: Eastman Kodak Company, Rochester, N.Y.

[21] Appl. No.: 947,642

[22] Filed: Sep. 18, 1992

Related U.S. Application Data

[62] Division of Ser. No. 633,506, Dec. 28, 1990.

[51] Int. Cl.$^5$ .................. B65D 85/66; B65D 85/67
[52] U.S. Cl. ................................ 206/53; 206/1.5; 206/807; 220/214; 220/326; 220/265
[58] Field of Search .............. 206/1.5, 53, 398, 470, 206/807; 220/284, 214, 265, 326

[56] References Cited

U.S. PATENT DOCUMENTS

| | | | |
|---|---|---|---|
| 1,996,682 | 4/1935 | O'Brien | 206/807 |
| 2,282,041 | 5/1942 | Draper | 220/214 |
| 3,125,873 | 3/1964 | Robinson | 206/1.5 |
| 3,424,303 | 1/1969 | Osojnak | 206/53 |
| 3,783,996 | 1/1974 | Gerald et al. | 206/807 |
| 3,828,899 | 8/1974 | Scott | 206/1.5 |
| 3,854,581 | 12/1974 | Jones, Jr. | 206/807 |
| 4,170,724 | 10/1979 | Waterbury | 206/807 |
| 4,219,116 | 8/1980 | Borkan | 206/1.5 |
| 4,437,566 | 3/1984 | Szahler | 206/1.5 |
| 4,532,566 | 7/1985 | Horimoto | 206/807 |
| 4,591,062 | 5/1986 | Sandhaus | 206/807 |
| 4,658,955 | 4/1987 | Eichner | 206/807 |
| 4,673,100 | 6/1987 | Reis et al. | 220/284 |
| 4,715,492 | 12/1987 | Holmes | 206/1.5 |
| 4,801,039 | 1/1989 | McCall et al. | 220/284 |
| 4,817,799 | 4/1989 | Gregerson et al. | 220/326 |
| 4,921,097 | 5/1990 | Finke et al. | 206/1.5 |
| 5,039,982 | 8/1991 | Bruhwiler | 206/1.5 |
| 5,111,953 | 5/1992 | Faust et al. | 220/214 |

FOREIGN PATENT DOCUMENTS

380321 8/1990 European Pat. Off. ............ 206/807

Primary Examiner—David T. Fidei
Attorney, Agent, or Firm—James A. Smith

[57] ABSTRACT

A two part clamshell web cassette is provided with a central recess for receiving a web roll core. The core and cassette half shells have mating surfaces which form a labyrinth light seal when the cassette is closed and which prevent rotation of the core during handling of the cassette to provide a core brake. Surfaces on the cassette parts clamp the web rail of a partially dispensed web roll when the cassette is closed. The core brake and web clamping surfaces facilitate transport of the cassette without loss of intra-roll web tension. The cassette is provided with a latch for retaining the cassette half shells in a closed light sealed condition. A frangible covering over a latch release means indicates when broken that the cassette may have been opened prematurely. The cassette further includes a web end retaining means which retains the web end portion to the underlying convolution. The cassette further includes an orientation of light to be identically molded and then rotated 180 degrees during assembly to cause the light blocking surfaces to mate.

8 Claims, 10 Drawing Sheets

FIG.16

FILM OR PAPER CASSETTE

This application is a division of application Ser. No. 07/633,506 filed Dec. 28, 1990.

CROSS REFERENCE TO RELATED APPLICATIONS

Reference is made to the following commonly assigned U.S. Applications:

1. Serial No. 07/633,522 entitled "Film Handling System" and filed in the names of Lyndon R. Huttemann, Michael Long, and Robert W. Sanford, and 2. Serial No. 07/633,508 entitled "Cassette Opening System" filed in the names of Donald O. Bigelow, Craig A. Caprio, and John B. Chemelli.

TECHNICAL FIELD

This invention relates to film cassettes and, more particularly, to an improved cassette for storing and dispensing light sensitive material such as photographic film or paper.

BACKGROUND ART

In film and paper finishing operations, it is desirable to eliminate the need for operations personnel to work in darkroom conditions. It is also desirable to automate the film or paper handling system to relieve operations personnel of routine manual labor and allow them to perform more important higher level functions.

It is known to use light proof cassettes for photographic film and paper handling. However, such cassettes generally require manual opening and removal of the film.

Also, such cassettes typically permit movement of a film or paper roll during handling of a cassette with automatic equipment and do not provide for closure and such handling of a cassette with a partially dispensed film roll. Moreover, the light sealing features of such cassettes are sometimes inadequate, resulting in light damage to the film.

DISCLOSURE OF THE INVENTION

In accordance with the invention, a clamshell web cassette is provided with a central recess which receives a web roll core. The core and cassette have mating surfaces which form a labyrinth light seal when the cassette is closed and prevent rotation of the core during handling of the cassette to provide a "core brake." Means on the cassette parts are provided to clamp the web tail of a partially dispensed web roll when the cassette is closed. This core clamping means and web clamping means facilitates transport of the cassette without loss of inter-roll web tension.

Another feature of the cassette is a unique latch for retaining the half shells in a closed light sealed condition. A frangible covering over a latch release means indicates when broken that the cassette may have been opened prematurely to damage the film through exposure to light.

Another feature of the cassette is the provision of unique light blocking surfaces which block light in both longitudinal and transverse directions relative to the film path.

Another feature of the cassette is a web end retaining means which retains the web end portion to the underlying convolution of the web roll but yet allows automatic pickup of the end portion. This feature, in combination with the core brake, enables the cassette to be transported with a full roll with minimal risk of roll movement or clockspringing.

Still another feature of the cassette is a unique orientation of light blocking surfaces on each half shell which permit the halves to be identically molded and then rotated 180 degrees during assembly to cause the light blocking surfaces to mate.

BRIEF DESCRIPTION OF THE DRAWINGS

Other advantages and features will become apparent from the following description taken in connection with the following drawings wherein.

MODE OF CARRYING OUT THE INVENTION

Referring to the drawings, there is shown a clam shell cassette 10 having two half shells 12 and 14, which are identical parts coupled together at one end by a hinge 16 and adapted to be releasibly coupled at the other end by a latch means 18. Each half shell is preferably molded from plastic material and provided with a plurality of reinforcing ribs 20 on its exterior surface.

Figure 2:
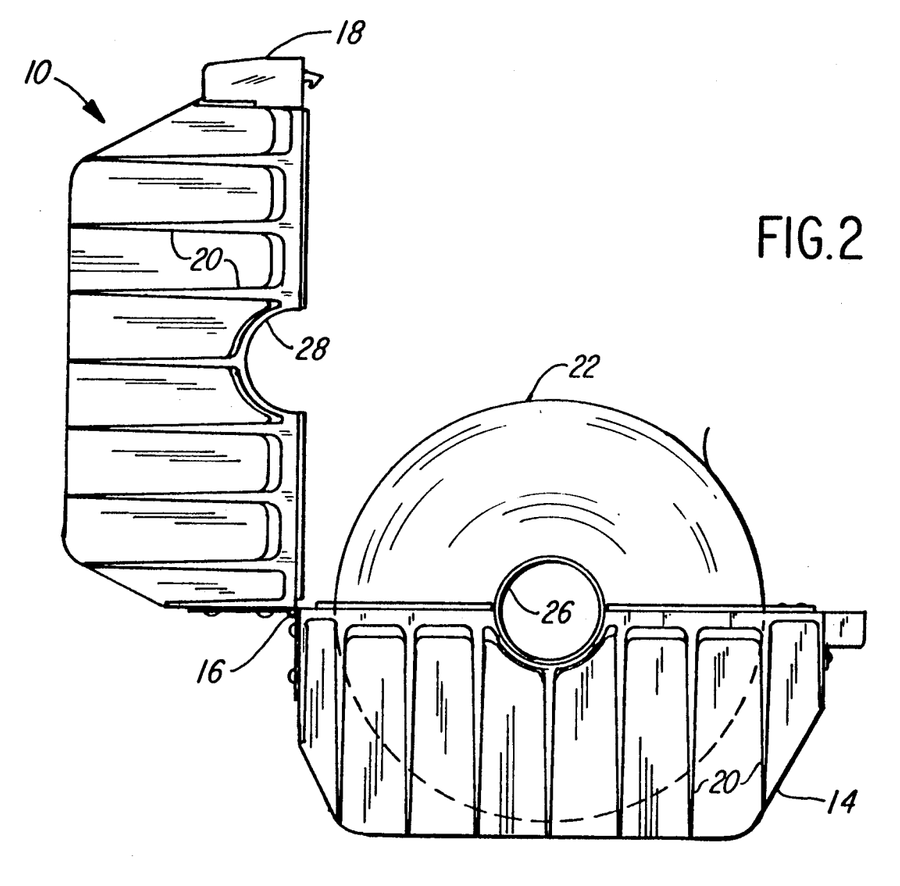
FIG. 2 is a side view similar to FIG. 1 showing the cassette open.
Figure 3:
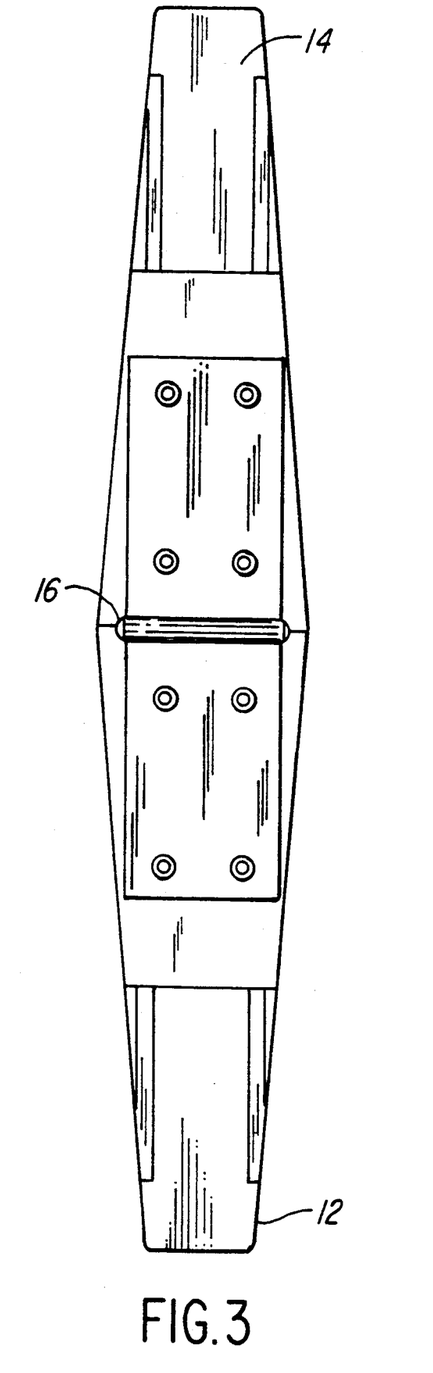
FIGS. 3 and 4 are opposite end views of the cassette shown in FIG. 1.
Figure 4:
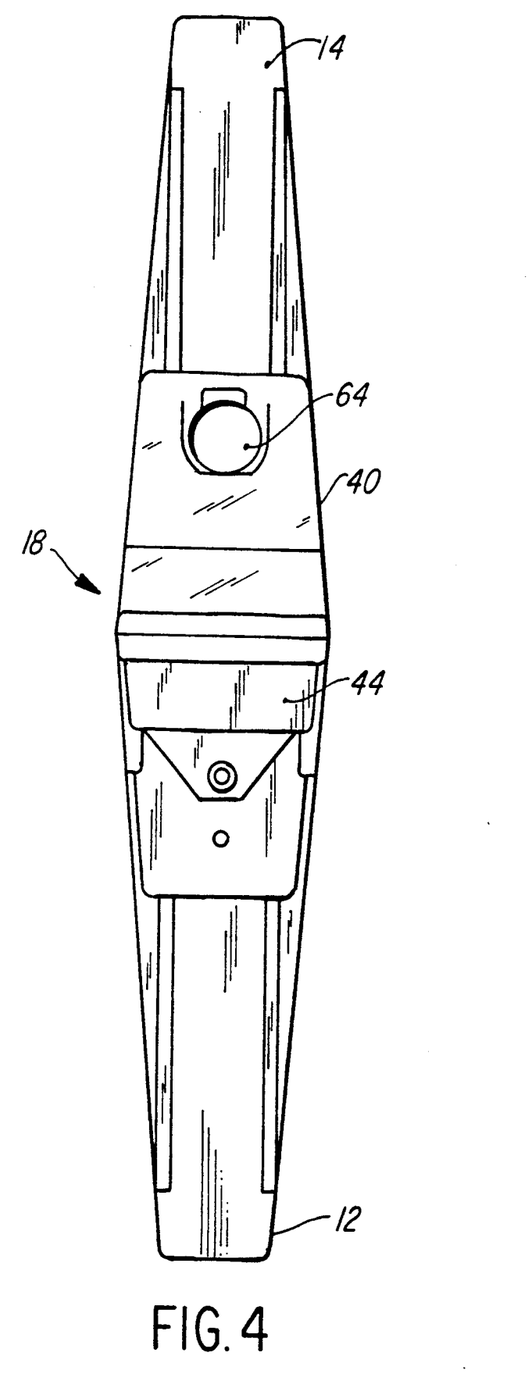

As shown in FIG. 2, the cassette 10 is adapted to receive a roll 22 of light sensitive material such as photographic film or paper. In a preferred application of the cassette stock rolls of photographic film are stored in such cassettes and transported in the cassettes to finishing stations where the film is removed for finishing and subsequent spooling into camera film rolls. Apparatus for opening and removing film from such a cassette is disclosed and claimed in copending application Ser. No. 07/633,522 cross referenced above and incorporated herein by reference.

Figure 13:
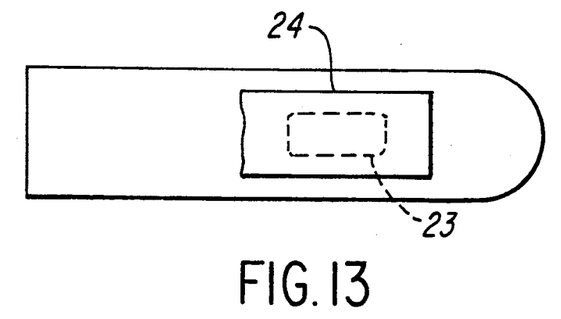
FIG. 13 is a top view of the film end portion illustrating the film end retaining means.

To prevent clockspring of the convolutions of the roll 22 during transport of the cassette, the leading portion is provided with a rectangular opening 23 (FIG. 13). A rectangular strip 24 of adhesive material having dimensions larger than opening 23 is attached to the outer convolution to cover the opening 23 and the adjacent portions of the outer convolution. The strip 24 adheres to both the outer convolution and the underlying convolution through the opening 23 to thereby retain the outer convolution to the roll with the very end of the leader free to be picked up by automatic equipment.

Figure 9:
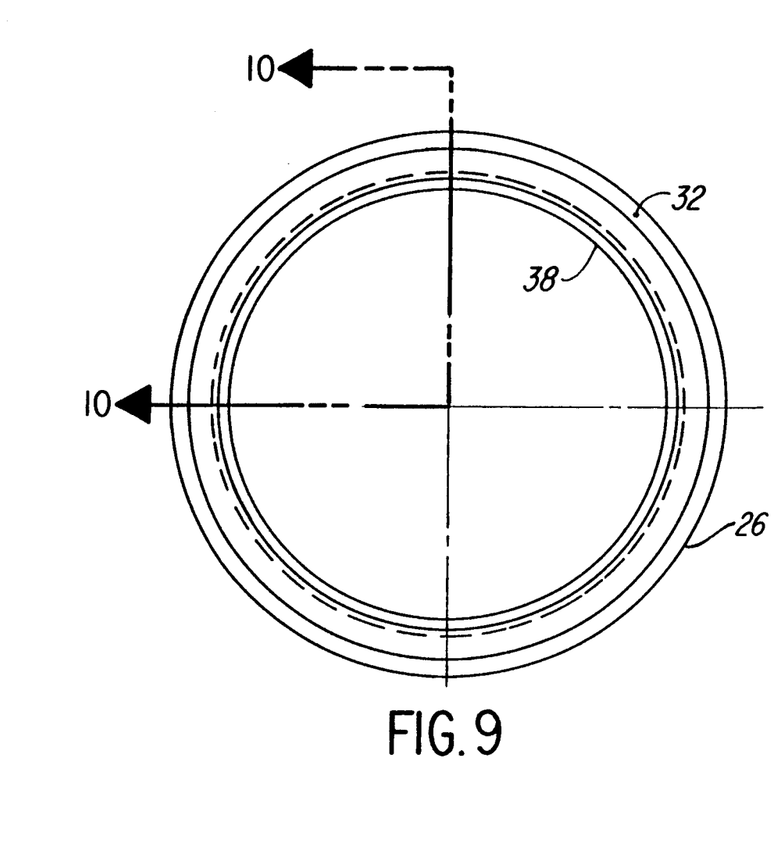
FIG. 9 is a side view of the film roll core.
Figure 10:
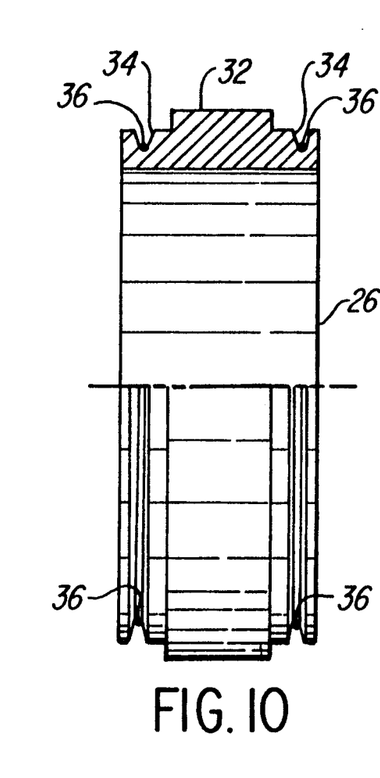
FIG. 10 is an end view of the film roll core shown in FIG. 9 in partial section taken along line 10—10 of FIG. 9.
Figure 11:
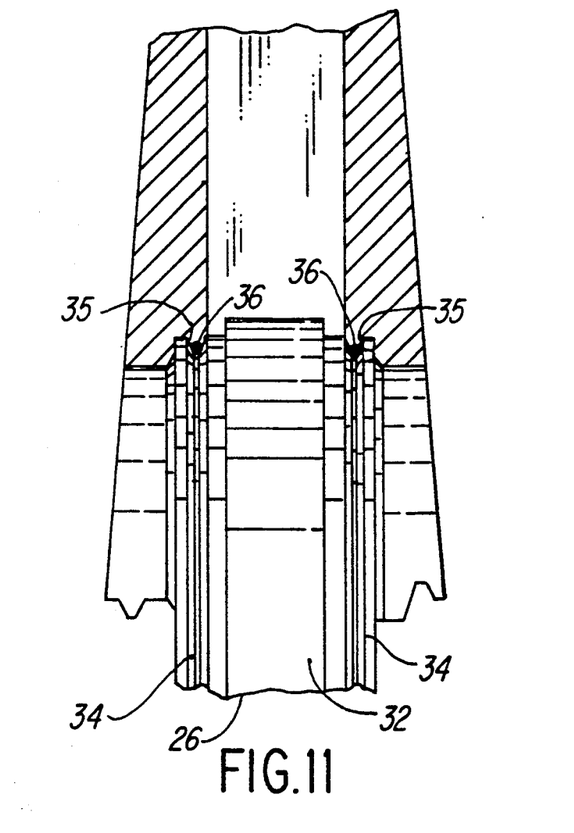
FIG. 11 is an enlarged view of a portion of the cassette and film core illustrating the mating light sealing surfaces of the cassette and film roll core.

The cassette 10 is provided with a removable circular core 26 for supporting the roll 22. The core 26 is adapted to be received in a central opening 28 formed by aligned semicircular recesses in the clam shell halves 12 and 14. As shown in FIGS. 9 and 10, the core 26 is provided with a peripheral surface 32 on which the film roll is wound. On each side of the roll receiving surface 32 is an annular recess 34. When the cassette is closed, each recess 34 engages a complemental rib 35 in the clam shell halves to form an effective labyrinth light seal between the core 26 and clam shell halves. The cassette is designed to disengage completely from the core during feeding of film as disclosed in copending application Ser. No. 07/633,522. This eliminates the need for dirt generating cassette/core bearing surfaces at the cassette core interface and eliminates the need for light locking exit rollers which may contact and damage the film.

Preferably, the end of the film roll is cinched to the core to allow the film to be fully removed from the core with automatic equipment.

The base of each recess 34 is sized to provide space for the inclusion of a ring 36 (FIG. 10) of compliant material. This material provides a slight interference fit between the core and closed cassette and thus provides a "core brake" which prevents rotation of the core and stockroll during transport.

Figure 14:
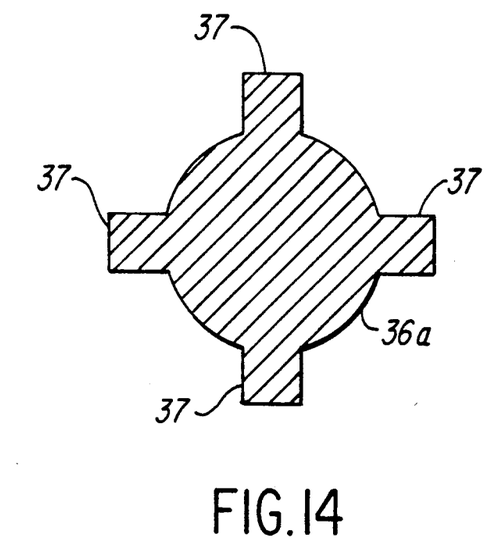
FIG. 14 is a cross section of another embodiment of the core clamping ring.

The ring 36 may comprise a simple O-ring having a circular cross section. Preferably, however, it will take the form shown in FIG. 14 and have a generally circular cross section provided with four integral longitudinal extensions on wings 37 equally radially spaced around the periphery of the circular center portion. The wings 37 enhance the braking and light sealing action of the ring.

The core 26 is provided with a central bore 38 adapted to receive an expandable shaft (not shown) for supporting and driving the film roll. Preferably, the internal bore of the core is of large diameter to facilitate easy loading and unloading with automatic equipment. When the cassette is open, the core will be free of the clam shell halves and the roll can be rotated by the shaft. Such operation is more fully disclosed in copending application Ser. No. 07/633,522 cross-referenced above and incorporated herein by reference.

As will be apparent from FIGS. 1 4 and FIGS. 7, 8 and 8a, the clam shell halves 12 and 14 have elongated ribs 39 and recesses 40 on their interfacing surfaces along the longitudinal axis of said surfaces which define a first light blocking means for blocking light in a direction transverse to such longitudinal axis. As shown specifically in FIG. 8, the ribs and grooves have surfaces in the area adjacent to the central opening 28 which extend both transversely and longitudinally and vary in height in a pattern determined empirically to define a second light blocking means which blocks light in both longitudinal and transverse directions relative to the longitudinal axis of the mating surfaces of the clamshell halves adjacent the central opening. The legend associated with FIG. 8 identifies the surfaces which are deeper and taller than a datum level. This orientation of such surfaces provides a complex labyrinth of light blocking surfaces which insure total blocking of ambient light. Further longitudinal light blocking is provided by the film clamping rolls described below.

Figure 15:
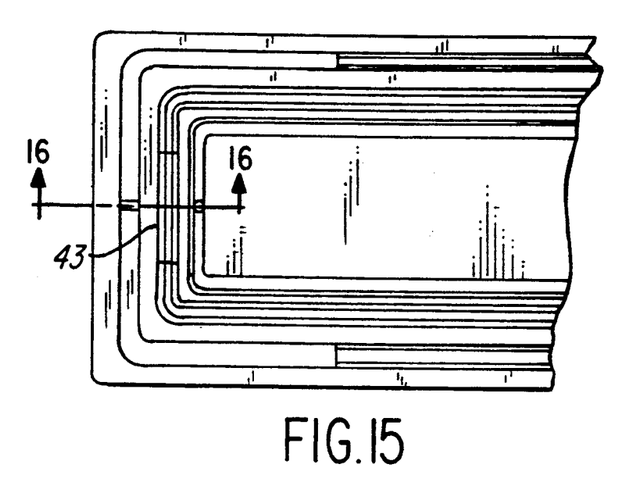
FIG. 15 is a detail showing a light locking member that is inserted in the hinge end of one of the clam shell halves during assembly.
Figure 16:
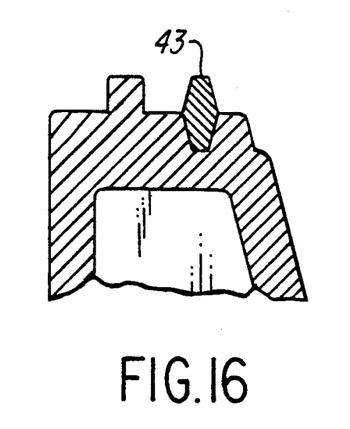
FIG. 16 is a section taken along the line 16—16 of FIG. 15.

The clam shell halves may comprise identical molded parts symmetrical along their longitudinal axis. The ribs and groove may be molded into the clam shell halves or attached after molding. Preferably, the parts are molded with the ribs and grooves integrally formed. To achieve mating of the identical half shell, the grooves in the upper portion of each clamshell half are axially aligned with the ribs in the lower portion. Because the clam shell halves are symmetrical along their longitudinal axis, two identical clam shell halves will mate when rotated 180 degrees and placed together. The only modification required after molding is the bonding of a small light blocking rib 43 (FIG. 15) in one of the half shells at the hinge end to prevent light from entering the hinge end.

Figure 5:
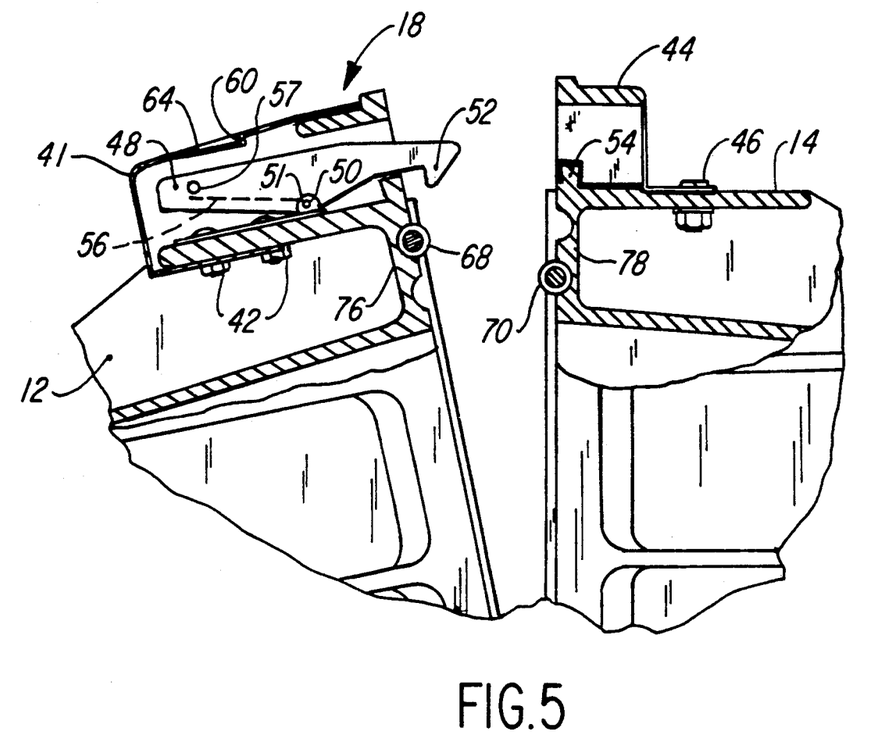
FIGS. 5 and 6 are views of a portion of the cassette in partial section showing the cassette latch in unlatched and latched positions respectively.
Figure 6:
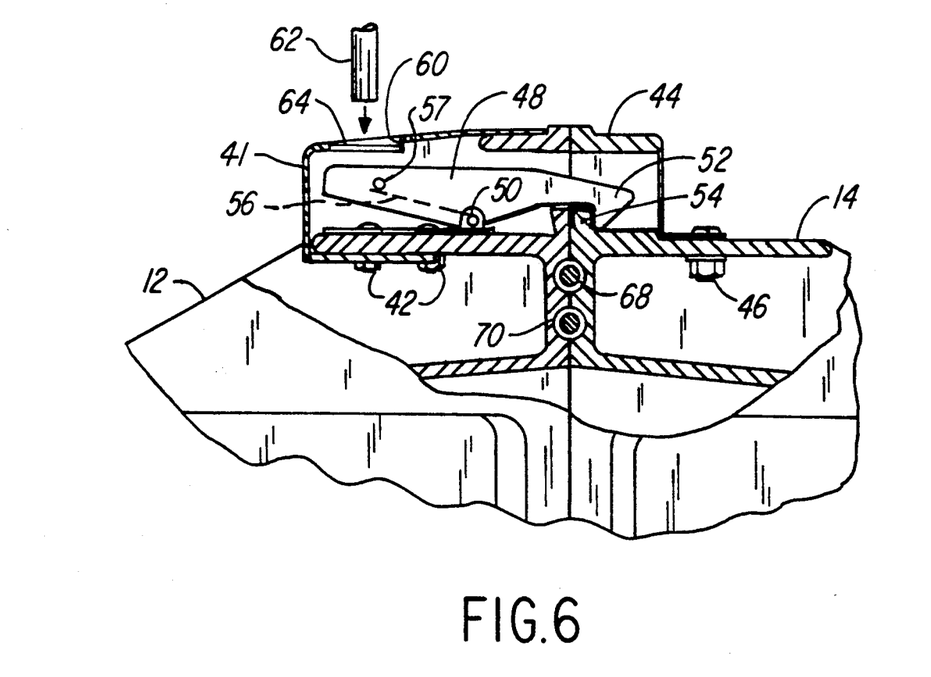
Figure 7:
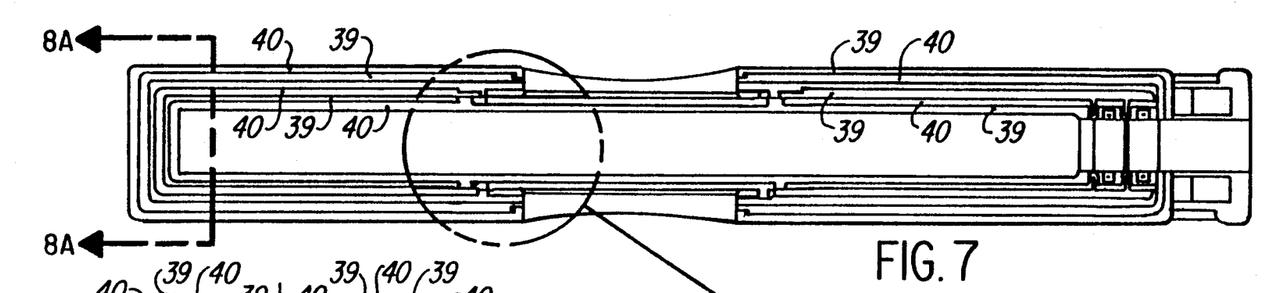
FIG. 7 is an end view of one of the cassette halves showing the light sealing means.
Figure 8:
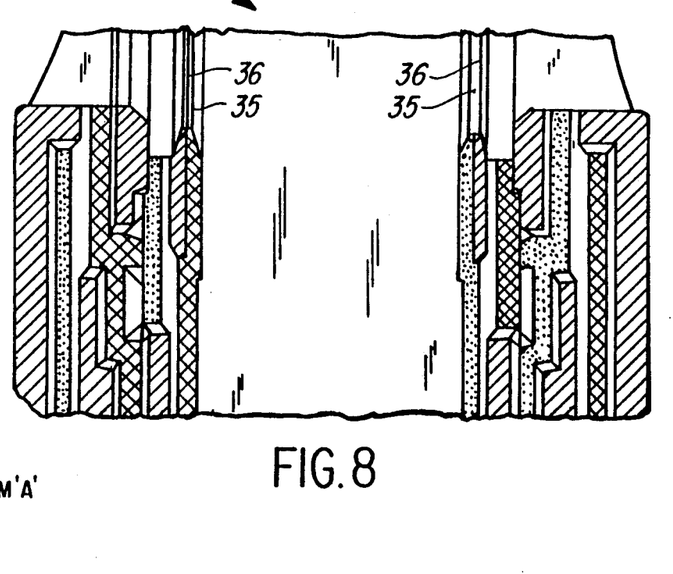
FIG. 8 is an enlarged view showing that portion of the light sealing means designated by the dashed circle in FIG. 7.
Figure 8A:
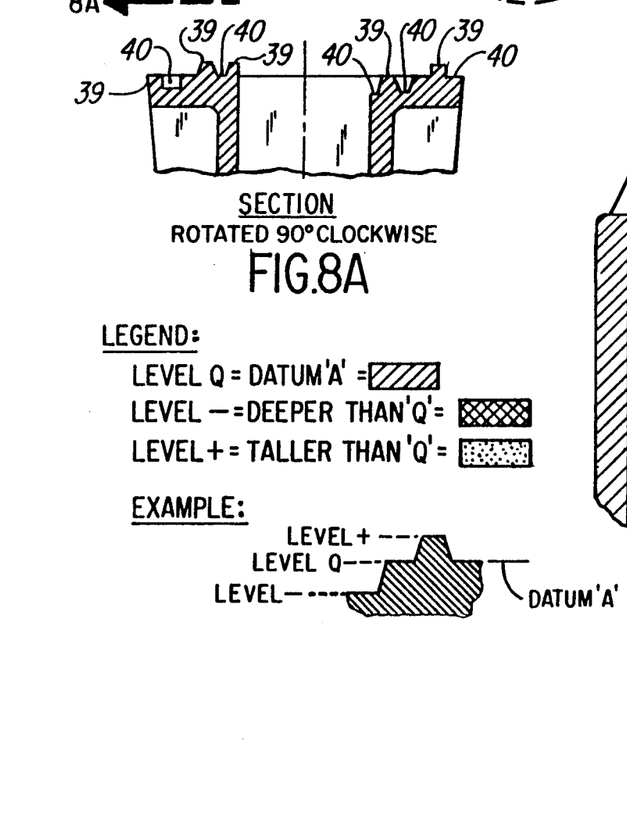
FIG. 8a is a section taken along the lines of 8A of FIG. 7 and rotated 90° clockwise.

Referring now to FIGS. 5 and 6 of the drawings, the latch 18 comprises a rectangular two part housing extending across the clam shell interface on the upper end of the cassette. The housing prevents accidental actuation of the latch arm described below. One housing portion 41 is attached to the clam shell half 12 by bolts 42 and the other housing portion 44 is attached to clam shell half 14 by bolt 46. A latch arm 48 pivotally supported by a pin 50 is positioned within the housing portion 41. The pin 50 is mounted in a bracket 51 and also attached to the clam shell half 12 by bolts 42. The latch arm 48 has a hook portion 52 adapted to be received within the housing portion 44 when the clam shell halves are closed to engage an abutment 54 on the clam shell half 14. The latch arm 48 is biased for pivotal clockwise movement by a leaf spring 56 having one arm attached to clam shell half 12 by bolts 42 and its other arm engaging a pin 57 on the arm 48. When the clam shell halves are open, the parts will be in the positions shown in FIG. 5. As the clam shell halves close, the hook portion 52 will move over the abutment 54 and assume the latched position shown in FIG. 6 under the bias of the spring 56.

Figure 1:
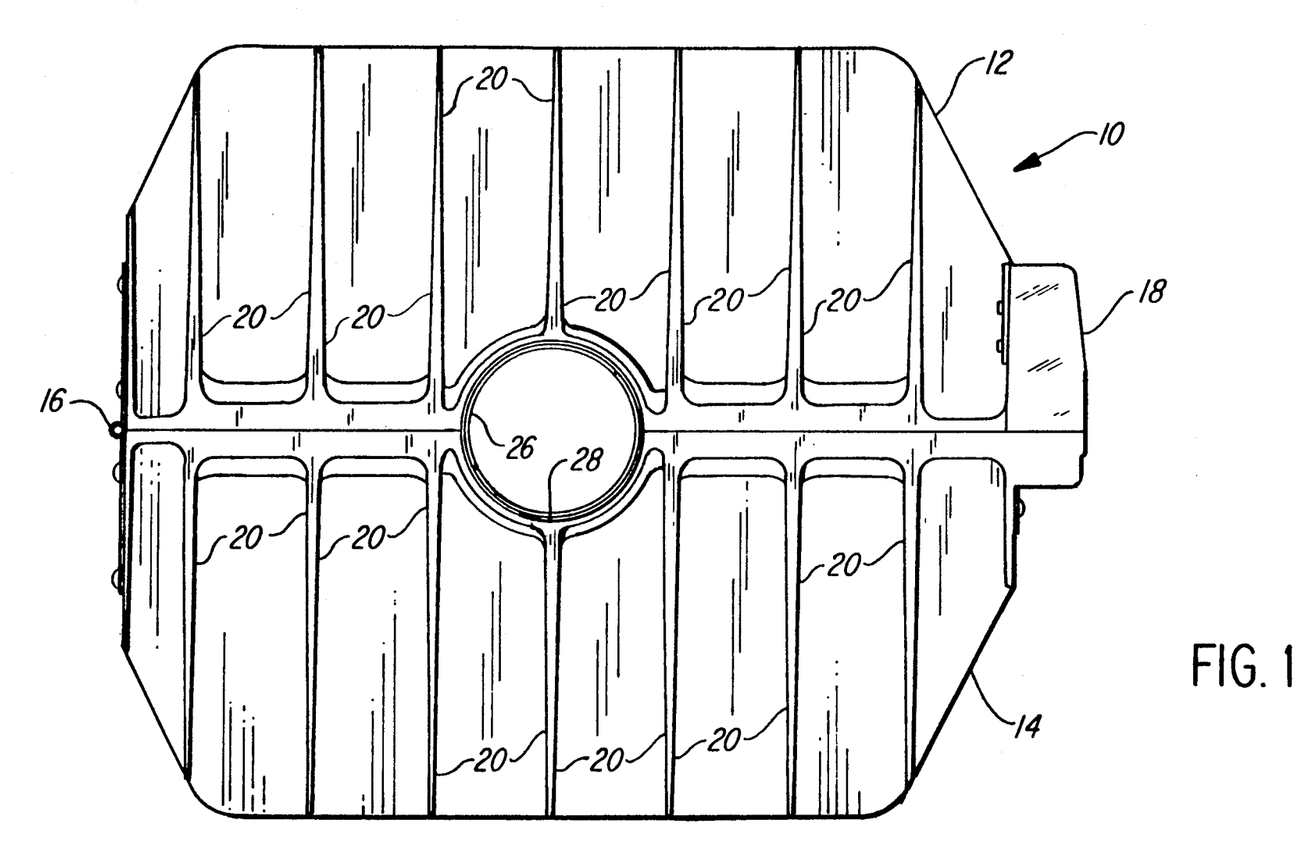
FIG. 1 is a side view of a film cassette in accordance with the invention.

As will be apparent from FIG. 1, the latch housing is not symmetrical with the half shells interface axis. This feature provides a space or notch on the right end of the latch housing, as viewed in FIG. 1, which can be detected by sensing equipment to determine whether the cassette is properly oriented or it can be used to prevent wrong way insertion in a nest having complemental non symmetrical surfaces.

An opening 60 is provided in the upper wall of housing portion 41 to permit insertion of a tool or shaft 62 to engage and release the latch arm 48. The opening 60 is covered with a frangible material 64, such as paper, attached to the housing portion 41 by a suitable adhesive. The material 64 may be attached to the housing upon inserting the film roll into the cassette. The presence of the material 64 in an unbroken state will indicate to a worker that the cassette has not been opened subsequent to loading the film roll. If the material 64 is torn, that condition will warn the operator that the cassette may have been opened and that the film may have been damaged by exposure to white light. The material 64 has particular utility in that it permits a worker to determine its condition by touch in dark room conditions.

Figure 12:
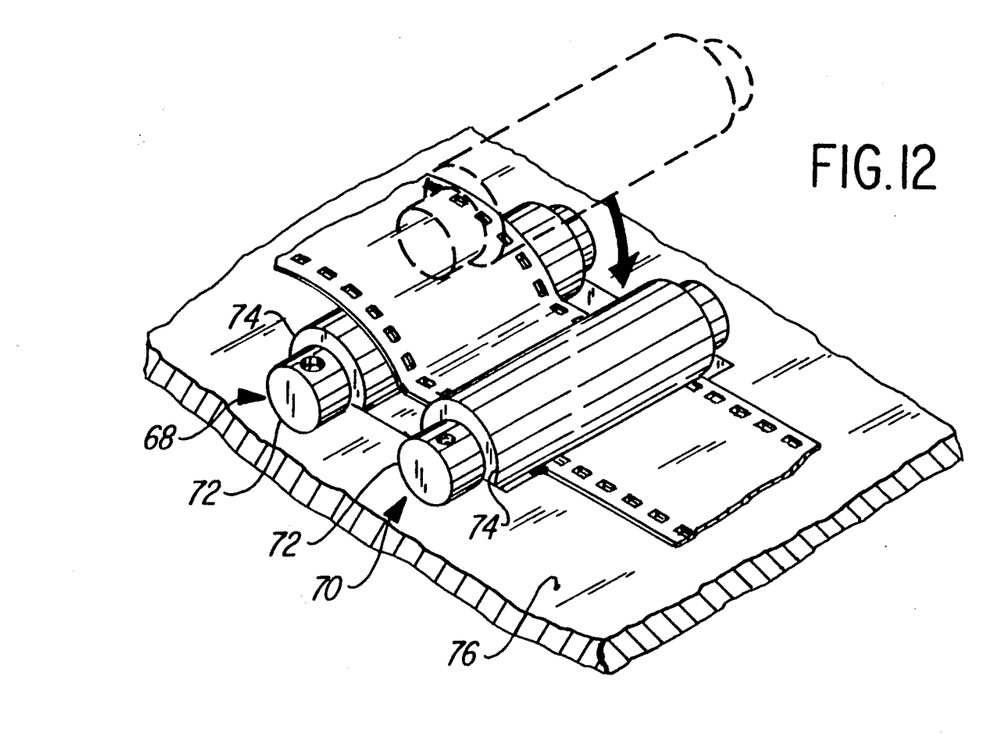
FIG. 12 is a perspective view illustrating the cassette film clamping and light sealing means.

Positioned on the clam shell halves below the latch means 18 is a means for clamping the film and sealing the cassette if it is necessary to close the cassette prior to removal of the entire film strip on the core. Such a need may arise if there is a failure of the finishing equipment to which the film is being transported. Referring to FIGS. 5, 6, and 12, this means comprises a pair of rolls 68 and 70. Each roll comprises an elongated shaft 72 and a compliant sleeve 74 fitted over the shaft (FIG. 12). Each sleeve 74 has a length greater than the width of the film and each shaft 72 has a length greater than that of the sleeve to thus extend from each end of the sleeve as shown in FIG. 12. One half of the roll 68 is fixed within a half cylindrical recess in the face surface of wall 76 of clam shell half 12. Similarly, one half of roll 70 is fixed within a half cylindrical recess in wall 78 of clam shell half 14, as shown most clearly in FIG. 5. When the clam shell halves are closed, the other half of each roll will be received by a half cylindrical recess in the other clam shell, as shown in FIG. 6. If the cassette is closed, the exiting film strip will be clamped between the two walls 76 and 78 with the rolls forcing the film into a serpentine configuration as shown in FIG. 12. This serpentine configuration provides secure clamping of the film and a labyrinth light seal along the longitudinal axis of the film.

The film clamping means comprising rollers 68 and 70 allow the cassette clam shell halves to close on a threaded-up film roll in a film unwind enclosure while preventing loss of inter roll tension. An operator can then open the enclosure and access it in room light conditions. If a cassette with a partially used roll is then removed from the unwind enclosure, the film would be cut by the operator with the free end left exposed and clamped by the compliant rolls 68 and 70 in the clam shell interface. During such removal and transport of the cassette, the "core brake" provided by the core cassette interface will prevent rotation of the film roll to thereby prevent loss of inter-roll film tension. The clamped free end and clamped core combination thus allows transport of cassettes containing partially used rolls without clockspringing of the roll. If a partially used roll is reused, the end would be reconfigured and reshaped, as shown in FIG. 13, in a dark area.

During the transport of a cassette with a full roll of film, the rolls 68 and 70 and associated recesses also function as a third light blocking means for blocking light in a direction parallel to the longitudinal axis of the interfacing surfaces of the half shells. This means, in combination with the first and second light blocking means described above, insures that the cassette will be totally light sealed. In fact, tests have shown that the ends of the cassette clam shell halves can be opened at the latch end 3/16 inch for two weeks without damaging the film.

It will now be apparent that a cassette in accordance with the invention possesses many advantages and facilitates the transport and removal of light sensitive material such as photographic film It will also be apparent that many features of the cassette have utility in cassettes for non-light sensitive materials Those skilled in the art to which the invention relates will appreciate that various substitutions and modifications can be made to the described embodiment without departing from the spirit and scope of the invention as described by the claims below.

What is claimed is:

1. A cassette for a roll of web material and for opening with a tool, said cassette comprising:
   first and second cassette parts each having a peripheral side wall, said cassette parts adapted to engage each other in a closed condition to enclose the roll of web material;
   releasible latch means for retaining said cassette parts in engagement in said closed condition, said latch means including an abutment member on the sidewall of one of said cassette parts and a latch member on the sidewall of the other of said cassette parts for engagement with said abutment member;
   housing means enclosing said latch means to prevent inadvertent release of said latch means, said housing means including a first housing part on one of said cassette parts and a second housing part on the other of said cassette parts, said housing parts have complemental interfacing surfaces which engage in said closed condition of said cassette parts to define a unitary housing substantially totally enclosing said latch means; and
   an opening in one of said housing parts permitting insertion of the tool to release said latch means.

2. A cassette as claimed in claim 1 further including a hinge for connecting said cassette parts.

3. A cassette as claimed in claim 2 wherein:
   said latch member is pivotally mounted on said other of said cassette parts, said opening being located in said one housing part adjacent said latch member.

4. A cassette as claimed in claim 3 further including means for biasing said latch member into engagement with said abutment.

5. A cassette as claimed in claim 1, 2, or 3 further comprising frangible material for covering said opening, said material being engaged and ruptured by the tool during insertion of the tool to release said latch means.

6. A cassette for a roll of light sensitive web material and for opening with a tool to facilitate use of the cassette with automatic opening equipment, said cassette comprising:
   first and second pivotally connected cassette parts having open and closed positions, said parts having interfacing surfaces engaging each other in said closed position;
   light blocking means associated with said interfacing surfaces to render said cassette substantially light tight in said closed position of said cassette parts;
   releasible latch means for retaining said parts in engagement in said closed position;
   housing means enclosing said latch means to prevent inadvertent release of said latch means, said housing means having an opening permitting insertion of the tool to release said latch means; and
   frangible material attached to said housing for covering said opening, said material being engageable and rupturable by the tool to release said latch means.

7. A claim shell cassette for containing a roll of light sensitive web material and for opening with a tool to facilitate use of the cassette with automatic opening equipment, said cassette comprising:
   first and second cassette parts having open and closed positions, said parts having interfacing surfaces engaging each other in said closed position;

light blocking means associated with said surface to render said cassette substantially light tight in said closed position of said cassette parts;

hinge means at one end of said cassette for coupling said first and second cassette parts to permit pivotal movement of said parts to said open position;

releasible latch means at the end of said cassette opposite from said one end for retaining said cassette parts in engagement in said closed position, said latch means including a pivotal latch member movable by the tool from a latched position to a released position;

a housing enclosing said latch member and having an opening to permit insertion of the tool to engage said latch member; and frangible material covering said opening to be engaged and ruptured by the tool during insertion of the tool to engage said latch member.

8. A clam shell cassette for containing a roll of light sensitive web material and for opening with a tool to facilitate use of the cassette with automatic opening equipment, said cassette comprising:

first and second cassette parts having open and closed positions, said parts having interfacing surfaces engaging each other in said closed position of said cassette parts;

light blocking means associated with said surface to render said cassette substantially light tight in said closed portion of said cassette parts;

hinge means at one end of said cassette for coupling said first and second cassette parts to permit pivotal movement of said parts to said open position;

an abutment on the exterior surface of said first cassette part at the end of said cassette opposite from said hinge means;

a latch member on the exterior surface of said second cassette part engageable with said abutment to latch said cassette parts together in said closed condition; said latch member being actuatable by the tool to disengage said abutment and release said cassette parts for movement to an open condition;

a housing substantially totally enclosing said latch member and said abutment to prevent inadvertent activation of said latch member, said housing having an opening for insertion of the tool to actuate said latch member; and frangible material covering said opening to be engaged and ruptured by the tool during insertion of the tool to engage said latch member.

* * * * *

UNITED STATES PATENT AND TRADEMARK OFFICE
CERTIFICATE OF CORRECTION

PATENT NO. : 5,310,049
DATED : May 10, 1994
INVENTOR(S) : Donald O. Bigelow, et al It is certified that error appears in the above-indentified patent and that said Letters Patent is hereby corrected as shown below:

Column 6, line 35, claim 1, change "or 3" to —3, or 4—

Column 6, line 62, claim 7, change "claim" to —clam—

Signed and Sealed this

Twenty-third Day of August, 1994

Attest:

BRUCE LEHMAN

Attesting Officer     Commissioner of Patents and Trademarks